US007876654B2

(12) United States Patent
Tada

(10) Patent No.: US 7,876,654 B2
(45) Date of Patent: Jan. 25, 2011

(54) OPTICAL DISK DRIVE CONTROL CIRCUIT

(75) Inventor: Yukinobu Tada, Yokohama (JP)

(73) Assignee: Renesas Technology Corp., Tokyo (JP)

( * ) Notice: Subject to any disclaimer, the term of this patent is extended or adjusted under 35 U.S.C. 154(b) by 1063 days.

(21) Appl. No.: 11/641,763

(22) Filed: Dec. 20, 2006

(65) Prior Publication Data

US 2007/0147206 A1 Jun. 28, 2007

(30) Foreign Application Priority Data

Dec. 22, 2005 (JP) ............................. 2005-369519
Oct. 25, 2006 (JP) ............................. 2006-290154

(51) Int. Cl.
*G11B 7/00* (2006.01)

(52) U.S. Cl. .............. 369/47.49; 369/53.23; 369/47.14; 369/44.32

(58) Field of Classification Search .............. 369/47.14, 369/47.49, 44.32, 53.15
See application file for complete search history.

(56) References Cited

U.S. PATENT DOCUMENTS 5,623,465 A * 4/1997 Sasaki et al. .............. 369/44.32
5,682,307 A * 10/1997 Sasaki et al. .............. 369/44.28
6,341,113 B1 * 1/2002 Kamiyama ............... 369/53.15

FOREIGN PATENT DOCUMENTS

| JP | 2000-090467 | 3/2000 |
| JP | 2003-168227 | 6/2003 |
| JP | 2003-281747 | 10/2003 |
| JP | 2005-056511 | 3/2005 |

OTHER PUBLICATIONS

Japanese Office Action dated Feb. 23, 2010; Application No. JP2006-290154.

* cited by examiner

*Primary Examiner*—Wayne R Young
*Assistant Examiner*—Adam R Giesy
(74) *Attorney, Agent, or Firm*—Antonelli, Terry, Stout & Kraus, LLP.

(57) ABSTRACT

An IC provided in an optical disk device having an objective lens and a pickup for a disk. The IC has a circuit for holding a signal which drives the objective lens in a focus or tracking direction and for detecting the moving direction of the objective lens, and a circuit for generating a signal which applies an acceleration to the objective lens. When the objective lens passes through a defect on the disk, on the basis of the detected moving direction of the objective lens, the IC applies the acceleration alternately in plus and minus directions to the objective lens to make the objective lens stationary. As a result, after the defect passage, the objective lens can be quickly returned to a focused point or an on-track position and reproducing/recording operation can be resumed.

6 Claims, 8 Drawing Sheets

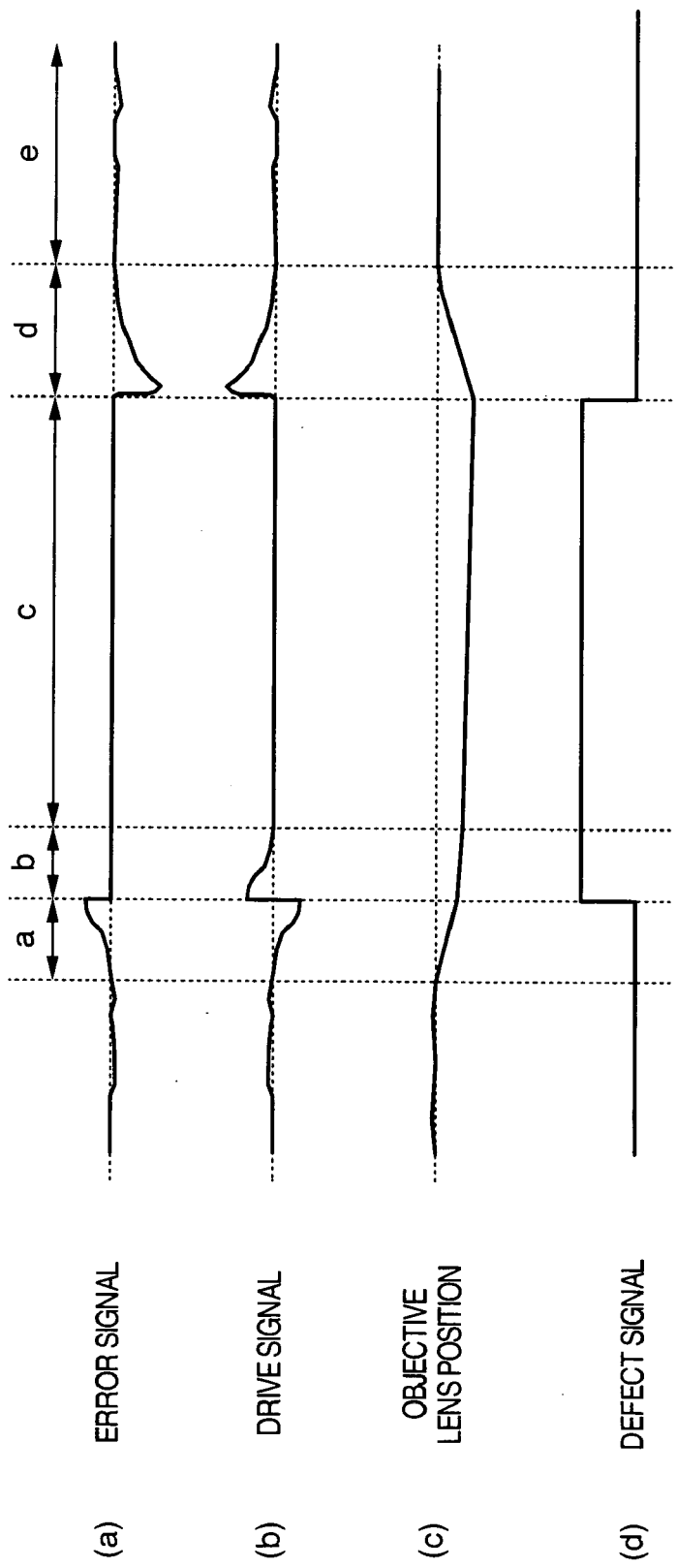

OPTICAL DISK DRIVE CONTROL CIRCUIT

INCORPORATION BY REFERENCE

The present application claims priorities from Japanese applications JP2005-369519 filed on Dec. 22, 2005, JP2006-290154 filed on Oct. 25, 2006, the contents of which are hereby incorporated by reference into this application.

BACKGROUND OF THE INVENTION

The present invention relates to an optical disk device, a circuit, or an IC (semiconductor integrated circuit device) provided for the optical disk medium, for optically reproducing (reading) or recording a signal (data/information) from/to an optical disk medium.

In a related art optical-disk device technique, a flaw or a defect (which will be abbreviated merely to defect, hereinafter) is coped with by controlling the optical disk device in such a manner that the device is put in a state immediately before passage of the defect on the disk after the defect passage under servo control.

There is such a description in Jp-A-2000-90467 that, when a large fluctuation component is included in a servo error signal immediately before generation of a defect detection signal (defect signal), a servo hold signal including a signal opposite in polarity to the servo error signal immediately after the generation of the defect detection signal is generated, the reading operation of a pickup is controlled according to the servo hold signal in place of a servo drive signal during the generation of the defect detection signal, which results in that, even after a reading point passes through the location of the defect on a recording medium, a servo state immediately before the passage of the defect can be maintained.

In a control system upon the defect detection in the related art, however, when a large fluctuation component before the defect detection is supplied to an actuator as a hold signal which involves the fluctuation component but which has the opposite polarity after the defect detection and an objective lens is correspondingly moved, the magnitudes of the fluctuation components are cancelled each other. However, an acceleration caused by the large fluctuation component before the defect detection is not exactly the same as an acceleration caused by the fluctuation component having the polarity opposite thereto. As a result, the objective lens is moved at a uniform velocity under control of the hold signal during the defect passage. Thus the related art has a problem that the objective lens cannot maintain a servo state immediately before the defect passage, that is, a position before the defect passage.

SUMMARY OF THE INVENTION

In view of the above problem in the related art, it is therefore an object of the present invention to provide a technique for an optical disk device which can solve the aforementioned problem, and which can avoid too much departure of an objective lens from a normal position, that is, from a focused position or an on-track position after passage of a flaw or a defect, or in other words, which can quickly return the objective lens to the normal position to resume reproducing/recording operation, by controlling the objective lens when an light beam spot passes through the flaw or the defect in a signal reproduction/record mode of an optical disk.

A summary of typical ones of aspects of the invention disclosed in the present application will be briefly explained as follows. In accordance with the present invention, the above object is attained by providing an optical disk device (disk drive device) for optically reproducing or for optically recording and reproducing data/information of a disk medium, and also by providing a circuit or an IC provided in the optical disk device, which involves technical means which follow. The disk device involves an optical pickup or head having a lens, a semiconductor laser, an actuator and so on for reading (reproducing) a signal from the set disk medium; hardware having a motor, a sensor and so on; a drive circuit for driving such head and hardware; and a drive control circuit for controlling the drive circuit. The above circuit parts are mounted in the form of an IC.

A circuit in the present invention is arranged so that, when a light beam spot passes through a defect on the disk, plus and minus accelerations are alternately applied to the objective lens so that displacements of the lens caused by these accelerations cancel each other, thus making the position of the lens relative to the disk stationary. Under this control, even immediately after the defect passage, the lens can be set at a normal position as much as possible or at a position (at which a signal can be correctly read out from the disk) in the vicinity of the normal position. In other words, immediately after the defect passage, the lens is quickly returned to the normal or focused position or to an on-track position. The above is implemented, for example, with detailed arrangements which follow.

(1) A circuit of the present invention is provided in an optical disk device. The optical disk device involves an objective lens for condensing a laser beam on a recording layer of a disk and an optical pickup for focusing the laser beam on the disk and detecting reflected light from the disk. The circuit has a first means for holding a signal (FC or TrC or FD or TrD) which drives the objective lens, a second means for detecting a moving direction of the objective lens, and a third means for generating a signal which applies acceleration to the objective lens. In the circuit, when a spot of the light beam passes through a flaw or defect present on the disk, the third means alternately applies accelerations to the objective lens in plus and minus directions (the accelerations to cancel displacement of the lens) on the basis of the moving direction of the objective lens detected by the first and second means, so as to stop the objective lens at a position just before the lens reaches a flaw or a defect, that is, at a signal-readable normal position (focused or on-track position). As a result, even (immediately) after passage of the flaw or defect, the objective lens can avoid too much departure from the normal position or a position in the vicinity thereof. In other words, the objective lens can be quickly returned to the normal position and can resume reproducing/recording operation.

(2) In the circuit of the present invention, the first and second means have a first drive control circuit for detecting a focus error signal (FE) on the basis of a signal from the pickup and for issuing a signal (FC or FD) which controls a focus actuator relative to the objective lens, a second drive control circuit for detecting a tracking error signal (TE) on the basis of the signal from the pickup and for issuing a signal (TrC or TrD) which controls a tracking actuator relative to the objective lens, and a circuit for detecting the flaw or defect and issuing a signal (DEF) which prescribes a time period of the passage of the flaw or defect. In the circuit, the third means applies alternately accelerations in the plus and minus directions to the objective lens according to the signal DEF during passage of the flaw or defect to stop the objective lens and to control the objective lens in such a manner that, immediately after the passage of the flaw or effect, the objective lens is located at the normal position or at a position in the vicinity thereof, or in other words, the objective lens is quickly returned to the normal position.

(3) In the circuit of the present invention, the second means has a differentiation circuit for differentiating the signal (FC or TrC) which drives the objective lens in a focus direction or in a tracking direction, and the third means has a circuit (acceleration generating circuit) for generating, from an output of the differentiation circuit, a waveform which alternately applies the accelerations to the objective lens in the plus and minus direction to make the objective lens stationary.

(4) In the circuit of the present invention, the first and second means has the first drive control circuit, the second drive control circuit, a circuit for issuing the signal (DEF), and a circuit for issuing a signal (DEFE) which extends the signal (DEF). In the circuit, the third means alternately applies the plus- and minus-directional accelerations to the objective lens to make the objective lens stationary, and immediately after passage of the flaw or defect, returns the objective lens to the focused position or an on-track position and simultaneously stops application of the accelerations to the objective lens.

Effects obtained by the typical ones of the aspects of the invention disclosed in this application will be briefly explained as follows. In the present invention, the actuator of the pickup is controlled during passage of the light beam spot through the flaw or defect in the reproduction/record mode of the optical disk, so that the plus- and minus-directional accelerations are alternately applied to the objective lens under feedforward control to make the objective lens stationary. As a result, after passage of the flaw or defect, the objective lens can avoid too much departure from the focused or tracking position. In other words, the objective lens can be quickly returned to the normal position to resume reproducing/recording operation.

Other objects, features and advantages of the invention will become apparent from the following description of the embodiments of the invention taken in conjunction with the accompanying drawings.

BRIEF DESCRIPTION OF THE DRAWINGS

FIG. 9 shows an example of operational waveforms of signals appearing in a related art optical disk device.

DETAILED DESCRIPTION OF THE EMBODIMENTS

Figure 1:
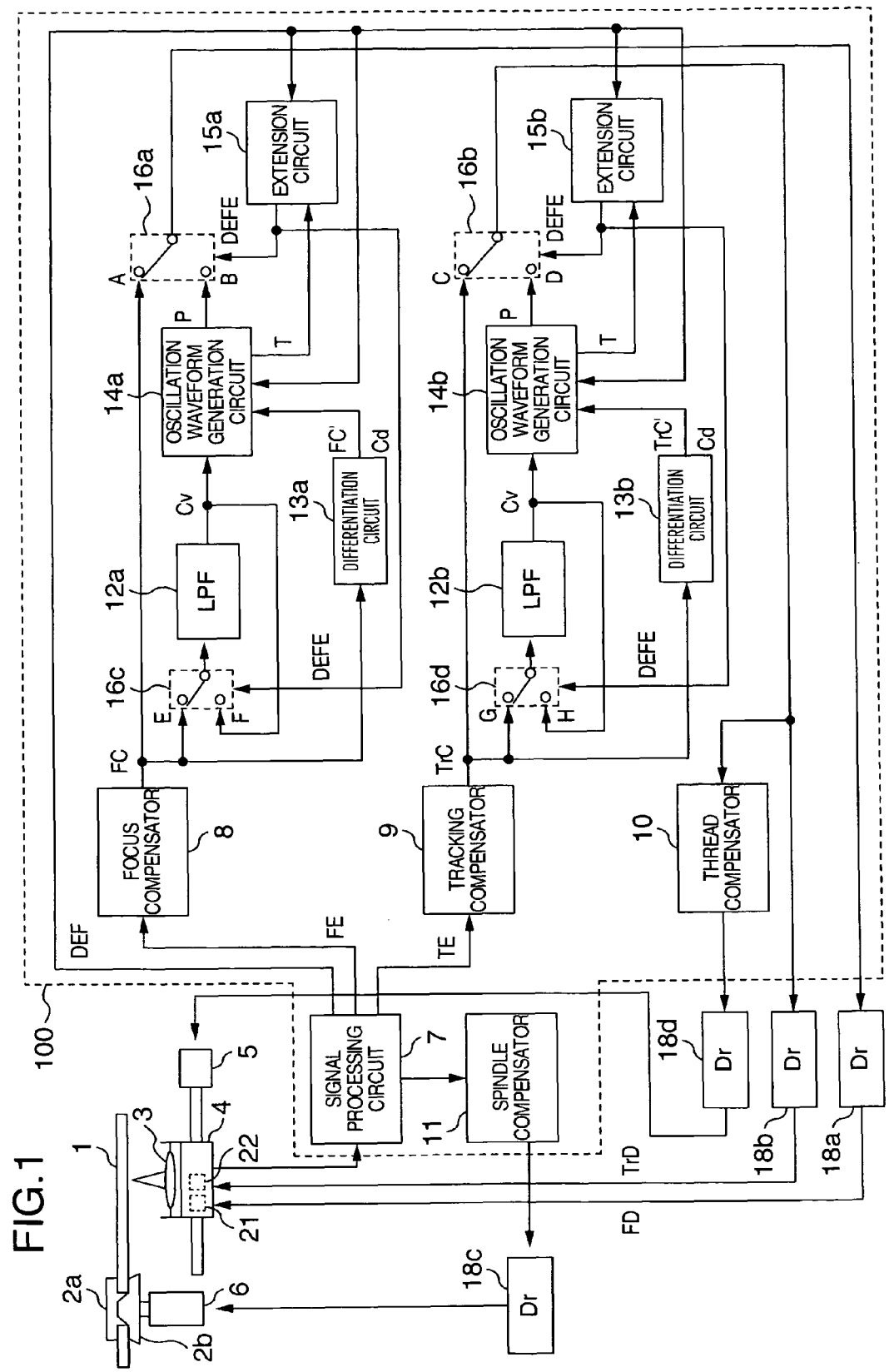
FIG. 1 shows an arrangement of an optical disk device in accordance with an embodiment 1 of the present invention.

Embodiments of the present invention will be explained in detail with reference to the attached drawings. In all the drawings for explaining the embodiments, constituent elements having the same functions are, in principle, denoted by the same reference numerals or symbols, and repetitive explanation thereof is omitted. FIGS. 1 to 8 are provided for explaining the embodiments, and FIG. 9 is for explaining a related art.

In the summary of the embodiments of the present invention, in the focus and tracking systems of servo control of the optical disk device, when an objective lens passes through a defect (or when the defect is detected), the objective lens oscillates (embodiment 1). Or upon passage (detection) of the defect, accelerations are alternately applied to the objective lens in plus and minus directions to make the objective lens stationary (embodiment 2). With it, the objective lens is kept at a normal position, and immediately after passage of the defect, the objective lens can be quickly returned to the normal position.

<Related Art>

For comparison with the embodiments, first of all, explanation will be made as to a problem to be solved in the present invention, by referring to FIG. 9. In FIG. 9, an error signal is shown in (a), a drive signal is shown in (b), an objective lens position is shown in (c), and a DEFECT signal is shown in (d). The error signal in (a) is obtained by reading operation from a disk and a pickup under servo control. The drive signal in (b) is to be applied to the disk and the pickup under the servo control. The DEFECT signal (DEF) is so-called a defect detection signal, that is, a signal indicative of a time period of passage through the flaw or defect.

In a duration 'a', first of all, the error signal of (a), prior to defect detection or before the DEFECT signal of (d) is changed to "HIGH", has a large fluctuation component due to start of the defect passage. As a result, the fluctuation component appears in the drive signal (b) and is applied to an actuator to operate an objective lens. For this reason, the objective lens starts to move with a certain acceleration. Due to the fluctuation component, the objective lens, which was originally located at a correct position (objective lens position (c)) (on a dotted line), starts to be displaced gradually from the correct position.

In a duration 'b', next, when the DEFECT signal of (d) is changed to "HIGH" (or a defect passage state), a fluctuation component having a polarity opposite to the fluctuation component in the duration 'a' appears in the drive signal of (b), and is applied to the actuator to move the objective lens. As a result, in the duration 'b', an acceleration having a direction opposite to when the objective lens starts to move in the duration 'a' takes place. At this time, when the acceleration of the duration 'a' generated when the objective lens starts to reach the defect is different in magnitude from the acceleration of the duration 'b' generated when the DEFECT signal of (d) is changed to "HIGH", it cannot cancel a first-given velocity and the objective lens position (c) continues to be displaced even in the duration 'c', for example, as shown in FIG. 9. When the DEFECT signal of (d) is changed to "HIGH", the reverse-polarity fluctuation component is not always applied in the duration 'b' but after the application the drive voltage of the drive signal (b) has the same voltage value in the duration 'c'. This means that the drive voltage of the actuator is kept and no acceleration is applied to the objective lens. Thus the velocity of the actuator is kept at a level before the voltage is kept. In other words, the objective lens is moved at a uniform velocity. For this reason, during the HIGH period (durations 'b' and 'c') of the DEFECT signal of (d), the objective lens position is displaced, so that, after the lens passes through the defect, the objective lens position (c) is moved as far as a position away from the information-readable normal position (on the dotted line). Thus, it takes a time in the duration 'd' until the objective lens position (c) is returned to the normal position after the defect passage and therefore it is in the duration 'e' or in the later duration that the objective lens position is returned to the normal position. The normal position refers to a focused position in the focus system or an on-track position in the tracking system.

As mentioned above, the control of the related art has eventually a problem that information cannot read out correctly from the optical disk in the 'b', 'c' and subsequent durations corresponding to the size (that is, an error range where reading of correct information becomes an error) of the defect, in particular, in the duration 'd'.

Embodiment 1

<Device Arrangement>

FIG. 1 is an arrangement of an optical disk device in accordance with an embodiment 1 of the present invention, showing, in particular, details of a circuit (drive control circuit) associated with servo control. The optical disk device has, as hardware and driver (drive circuit) part for driving a disk 1, a clamper 2a, a turntable 2b, an objective lens 3, a pickup (optical pickup) 4, a thread motor 5, and a spindle motor 6, which are driven by drive circuits (Drs) 18a, 18b, 18c, and 18d respectively. The optical disk device also has an IC (semiconductor integrated circuit device) 100 having a circuit for performing drive control or mainly servo control mounted therein. The pickup 4 is connected with the objective lens 3 and is provided with actuators 21, 22 for actuating the objective lens 3.

The IC 100 has a signal processing circuit 7, a focus compensator 8, a tracking compensator 9, a thread compensator 10, a spindle compensator 11, low-pass filters (LPFs) 12a, 12b, differentiation circuits 13a, 13b, oscillation waveform generation circuits 14a, 14b, extension circuits 15a, 15b, and switches 16a, 16b, 16c, 16d. In this connection, the IC 100 may also be provided in the form of a single unit including other control circuits or drive circuits.

The drive control circuit in the focus system has the signal processing circuit 7, the focus compensator 8, the LPF 12a, the differentiation circuit 13a, the oscillation waveform generation circuit 14a, the extension circuit 15a, the switches 16a, 16c, and the drive circuit 18a. The drive control circuit in the tracking system has, as a similar arrangement, the signal processing circuit 7, the tracking compensator 9, the LPF 12b, the differentiation circuit 13b, the oscillation waveform generation circuit 14b, the extension circuit 15b, the switches 16b, 16d, and the drive circuit 18b. The focus system (associated with FE) and the tracking system (associated with TE) have substantially the same control, and corresponding circuits of the systems also have substantially the same arrangement. It is desirable to perform the control of these systems at the same time. Although both the systems are mounted in the present embodiment, these systems may be executed independently of each other or only the circuit of one of these systems may be mounted.

In the present embodiment, a means for holding a signal which drive the objective lens 3 is implemented by the drive control circuit and the drive circuit in the focus or tracking system. A means for detecting the moving direction of the objective lens 3 is implemented by the arithmetic operations of the signal processing circuit 7 and compensators. However, the present invention is not limited to such an implementation circuit example. For example, such an arrangement may be possible that a sensor or the like for detecting the position of the objective lens 3 is mounted directly to the pickup 4. A means for generating a signal which oscillates the objective lens 3 is implemented by a feedforward control system mainly including the oscillation waveform generation circuits 14a, 14b.

The disk 1 placed on the turntable 2b is fixed onto the turntable 2b by the clamper 2a. The disk 1 is rotated by driving the spindle motor 6.

Figure 2:
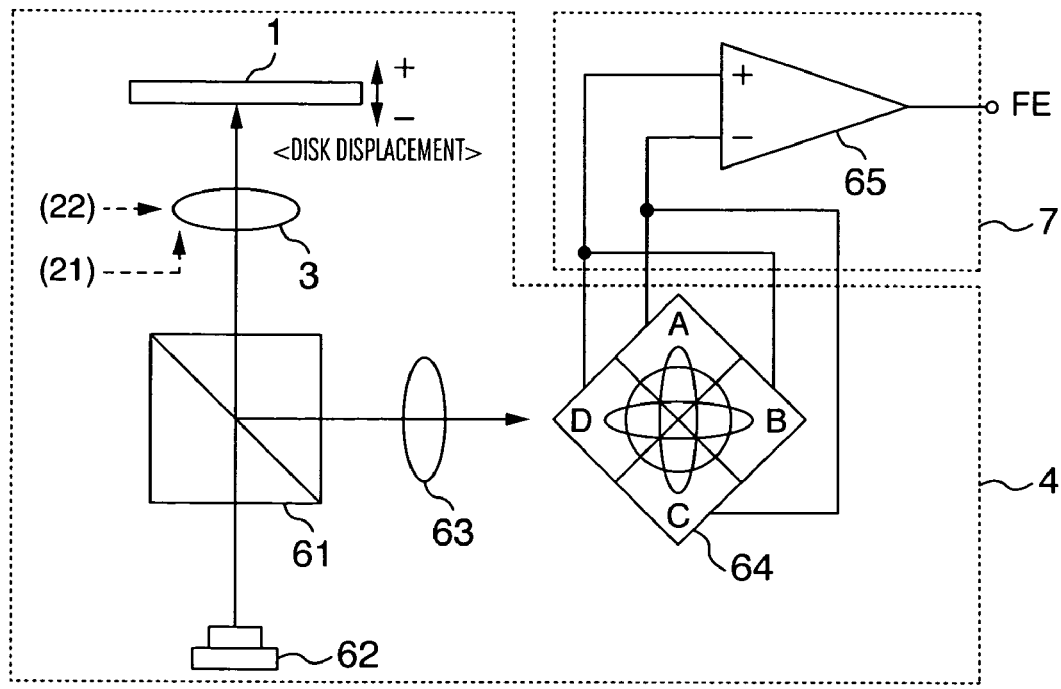
FIG. 2 shows, as an example, an arrangement of a pickup and an arrangement of a signal processing circuit for detection of a focus error signal in the optical disk device of the embodiment 1 of the present invention.

FIG. 2 shows, as an example, a part (data reading section) of the optical disk device including a semiconductor laser and an optical system in the pickup 4 and including a circuit for detecting a focus error signal (FE) of the signal processing circuit 7. In the arrangement example, the pickup 4 relative to the disk 1 has the objective lens 3, a half prism 61, a semiconductor laser 62, a light collecting lens or condenser 63, and a photodetector 64. The signal processing circuit 7 has an error calculator 65. The pickup 4 also has a focus actuator 21 (not shown) and a tracking actuator (not shown) 22 for moving the objective lens 3. The actuators moves the objective lens 3 in a focus direction (vertically of the disk 1) and in a tracking direction (horizontally of the disk 1 respectively).

A light flux emitted from the semiconductor laser 62 is passed through the half prism 61, and focused by the objective lens 3 on the disk 1 as a beam spot. Laser reflected light from the disk 1 is passed again through the objective lens 3, reflected by the half prism 61, passed through the condenser 63, and focused on the photodetector 64 as a beam spot.

FIG. 2 shows a specific arrangement example of detecting the focus error signal (FE) in the photodetector 64. The photodetector 64 is made up of 4 areas A, B, C, and D which are electrically connected each other in pairs on diagonal lines. The photodetector 64 is arranged so that, when the disk 1 and the objective lens 3 are located at a focus position (focused point), the beam spot incident to the photodetector 64 has a circular shape. Under this condition, added outputs of the areas A, C and the areas B, D are applied to the error calculator 65 and amplified. The amplified output (FE) of the error calculator 65 becomes zero. When the position of the disk 1 is now vertically shifted from the focus position of the objective lens 3, the beam spot incident to the photodetector 64 has a vertically-extended or horizontally-extended shape. This phenomenon is utilized. That is, such a signal FE varying according to a shift amount from the focus position and to a shift direction as shown in FIG. 3 is detected by the error calculator 65 (so-called astigmatism method).

Figure 3:
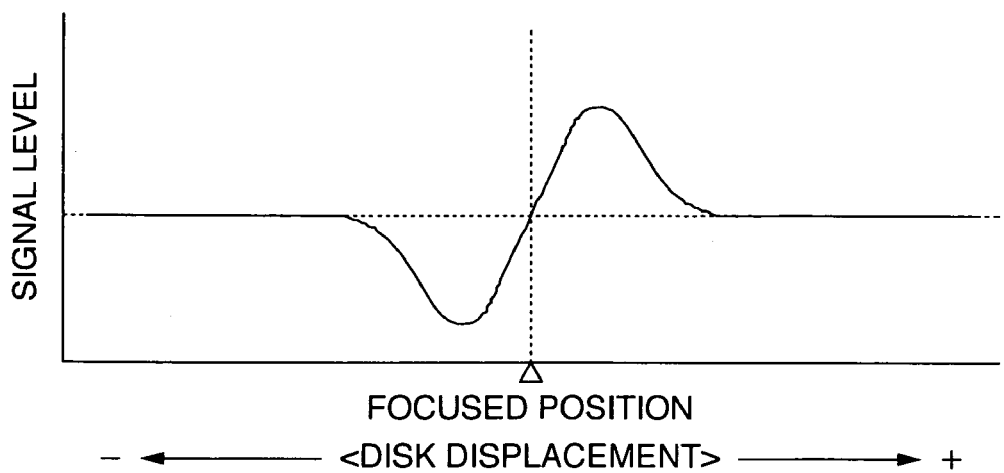
FIG. 3 shows a focus error signal relative to a disk displacement in the optical disk device of the embodiment 1 of the present invention.

In FIG. 3, the signal FE is expressed by a distance (disk displacement) between the objective lens 3 and the disk 1 in its abscissa axis and by a signal level in its ordinate axis. An S-shaped curve of the signal FE is featured by being zero-crossed at a point (focused point) when the focal point of the objective lens 3 is on the recording surface of the disk 1. A + (plus) direction corresponds to when the objective lens 3 approaches the disk 1, whereas, a − (minus) direction corresponds to when the objective lens 3 is moved away from the disk 1. In this connection, the polarity of the S-shaped curve may be inverted in some cases depending on the polarity of inputs to the error calculator 65. In such a case, the concept of the signal level and the disk displacement is reversed, as a matter of course.

In FIG. 1, the signal FE generated by the error calculator 65 is supplied to the focus compensator 8. Feedback control is carried out in the vicinity of the zero-cross point of the S-shaped curve of the signal FE using a lag or lead compensator and so on in the focus compensator 8, and the focus compensator 8 generates and outputs a control signal (focus control signal FC) to control the actuator 21 which moves the objective lens 3 in the focus direction. The output signal FC is supplied to the switch 16a. The switch 16a is switched, in a normal state, to its terminal A, corresponding to a closed control loop of moving the objective lens 3 to the focus direction, and the switch 16a supplies the signal FC to the drive circuit 18a. The drive circuit 18a generates a voltage to actuate the actuator 21 and supplies the voltage to the pickup 4. Through the actuation of the actuator 21 based on the voltage (focus drive signal FD) received from the drive circuit 18a, the focus direction of the objective lens 3 is controlled, the focus control of the feedback control loop is achieved, that is, the objective lens is kept always at the focused point.

Meanwhile, the tracking error signal TE generated in the signal processing circuit 7 is supplied to the tracking compensator 9. The tracking compensator 9 performs feedback control on the input signal using a lag or lead compensator and so on, and generates a control signal (tracking control signal TrC) for the tracking actuator 22 which moves the objective lens 3 in the tracking direction. The output signal TrC is supplied to the switch 16b. The switch 16b is switched, in a normal state, to a terminal C, showing a closed control loop of moving the objective lens 3 in the tracking direction, and the switch 16b supplies the signal TrC to the drive circuit 17b. The drive circuit 18b generates a voltage for operating the tracking actuator 22 and supplies the voltage to the pickup 4. Through the operation of the actuator 22 based on the voltage (drive signal) from the drive circuit 18b, the objective lens 3 is controlled in the tracking direction, the tracking control of the feedback control loop is achieved, and the lens is kept always in the on-track state where the spot is on a pit on the recording surface.

The control signal TrC output from the tracking compensator 9 is supplied even to the thread compensator 10 via the switch 16b. The thread compensator 10 performs feedback control on the input signal using a lag or lead compensator and so on, generates a control signal to control the thread motor 5 according to the displacement of the objective lens 3 in the tracking direction, and supplies the control signal to the drive circuit 18d. The drive circuit 18d generates a voltage (drive signal) to operate the thread motor 5, and supplies the voltage to the thread motor 5 to thereby drive the thread motor 5 and to move the pickup 4 itself.

The signal processing circuit 7 supplies rotational period information read out from the disk 1 to the spindle compensator 11. The spindle compensator 11 performs feedback control using a lag or lead compensator and so on, generates a signal to control the spindle motor 6 on the basis of the rotational period information, and supplies the signal to the drive circuit 18c. The drive circuit 18c generates a voltage (drive signal) to drive the spindle motor 6, and supplies the voltage to the spindle motor 6 to drive the spindle motor 6.

The above explanation has been made as to a normal record or reproduction control of the objective lens 3, the thread motor 5, and the spindle motor 6 for laser beam spot to be located at the focused point and at the on-track position.

There may occur such a situation that information based on the reflection of light from the disk 1 cannot be obtained due to a flaw, a defect or the like on the disk 1. In this case, since information based on the light reflection cannot be obtained, the signal processing circuit 7 cannot correctly generate the signal FE or the signal TE. A state or area of the "defect" on the disk 1 is associated with the impossibility of reading the reflected light from the disk 1, which is detected as the DEFECT signal.

In order to avoid the influence of the defect when the light beam spot is passed through the defect, the device is arranged during the defect passage period basically so as not to control the objective lens 3 in the focus or tracking direction (conventional control). In the IC 100, as control upon the defect passage, the control loop is opened. That is, the switch 16a is switched to a terminal B, the switch 16b is switched to a terminal D, the switch 16c is switched to a terminal F, and the switch 16d is switched to a terminal H, respectively. In broad classification, the feedback control is carried out at the terminal A of the switch 16a or at the terminal C of the switch 16b; whereas, the feedforward control is carried out at the terminal B of the switch 16a or at the terminal D of the switch 16b.

<Focus Control>

Explanation will be made, as the above defect control, as to firstly focus control of controlling the objective lens 3 in the vertical direction relative to the disk 1. In such a state that the focus control to the focused position is stationarily carried out, the output FC of the focus compensator 8 is supplied to the switch 16c. In the normal state, the switch 16c is switched to the terminal E, and thus the switch 16c outputs the output FC of the focus compensator 8 to the LPF 12a as it is.

The LPF 12a is a low pass filter having a band lower by about 1/10 of a band for control of the objective lens 3 in the focus system. Since the low pass filter has such a characteristic as to pass signals having frequencies near to the rotational frequency of the spindle motor 6, the filter is immune to a high frequency waveform such as noise. In other words, the LPF 12a keeps a control voltage value immediately prior to the defect passage. An output (LPF signal Cv) from the LPF 12a is supplied to the oscillation waveform generation circuit 14a and to the switch 16c.

The feedforward control system FC issued from the focus compensator 8 is supplied to the differentiation circuit 13a. The differentiation circuit 13a differentiates the input signal FC. Code information (direction determination signal Cd) on a signal FC' (focus differentiation signal) obtained by differentiating the input signal FC to the differentiation circuit 13a is supplied to the oscillation waveform generation circuit 14a. The code information uses, for example, an uppermost bit of the signal FC'.

The oscillation waveform generation circuit 14a, on the basis of the code information Cd supplied from the differentiation circuit 13a, generates a waveform P to be oscillated from a direction 'd' in which the objective lens 3 oscillates and from the level of the signal Cv supplied from the LPF 12a. The waveform P to be oscillated also involves even the direction 'd' to be oscillated as information. The waveform P to be oscillated is required to have a frequency to which the actuator 21 sufficiently responds. For example, for the actuator of the optical disk, the waveform is a sinusoidal wave having a frequency of about 1 kHz or less. A signal P generated by the oscillation waveform generation circuit 14a is supplied to the switch 16a. During the defect passage, the switch 16a is switched to the terminal B, so that a signal P generated by the oscillation waveform generation circuit 14a is supplied via the switch 16a to the drive circuit 18a. Using the signal P, the drive circuit 18a generates a voltage FD to operate the actuator 21, and supplies the voltage into the pickup 4. The voltage FD from the drive circuit 18a causes the objective lens 3 to be controlled so as to oscillate in the focus direction (refer to (e) and (f) in FIG. 4).

When the light beam spot passes through the defect, the signal processing circuit 7 generates the DEFECT signal DEF. The DEFECT signal DEF is changed to "HIGH" upon the defect passage. The signal DEF issued from the signal processing circuit 7 is supplied to the extension circuit 15a and also to the oscillation waveform generation circuit 14a. A timing signal T is supplied from the oscillation waveform generation circuit 14a to the extension circuit 15a. The timing signal T indicates a DEFECT extension time, that is, a time period between the points C and D in FIG. 4.

From the signal DEF supplied from the signal processing circuit 7 and the timing signal T supplied from the oscillation waveform generation circuit 14a, the extension circuit 15a generates a signal DEFE (DEFECT extension signal) to extend the DEFECT signal DEF. The signal DEFE generated in the extension circuit 15a is supplied to the switches 16a and 16c. When the signal DEF generated in the signal processing circuit 7 is changed to "HIGH", the oscillation waveform generation circuit 14a outputs the oscillation waveform P which determines the level of the oscillation waveform P and the oscillation starting direction 'd' to oscillate the objective lens 3, on the basis of the direction determination signal Cd received from the differentiation circuit 13a and the level of the signal Cv received from the LPF 12a. The oscillation waveform P oscillates during a period corresponding to the "HIGH" period of the signal DEF (repetitively varies between "HIGH" and "LOW").

When the oscillation of the oscillation waveform P starts at the beginning of the "HIGH" period of the signal DEF and thereafter the light spot passes through the defect and the signal DEF is changed to "LOW", the oscillation waveform generation circuit 14a is arranged so as not to immediately stop the output (oscillation) of the oscillation waveform P. That is, in order to continue the oscillation of the oscillation waveform P until the objective lens 3 reaches the focused position after the defect passage, the oscillation waveform generation circuit 14a generates the timing signal T after the signal DEF is changed to "LOW", and supplies the timing signal T to the extension circuit 15a. The extension circuit 15a generates the DEFECT extension signal DEFE on the basis of the timing signal T even the signal DEF is changed to "LOW". The signal DEFE generated in the extension circuit 15a causes the signal DEFE to continue the "HIGH" duration for a while even immediately after the signal DEF generated in the signal processing circuit 7 is changed from "HIGH" to "LOW". In response to it, the switch 16a keeps the terminal B switched thereto, and the switch 16c keeps the terminal F switched thereto.

While the switch 16a is switched to the terminal B and the switch 16c is switched to the terminal F, the control loop of the focus control is open so that no such feedback control as mentioned above is carried out. That is, the signal P from the oscillation waveform generation circuit 14a causes the device to be put in a feedforward control state. During the "HIGH" period of the signal DEFE, the switch 16c is switched to the terminal F, so that the output of the LPF 12a is supplied again to the LPF 12a, with the result that the output value Cv of the LPF 12a becomes constant.

<Focus Control—First Case>

Figure 4:
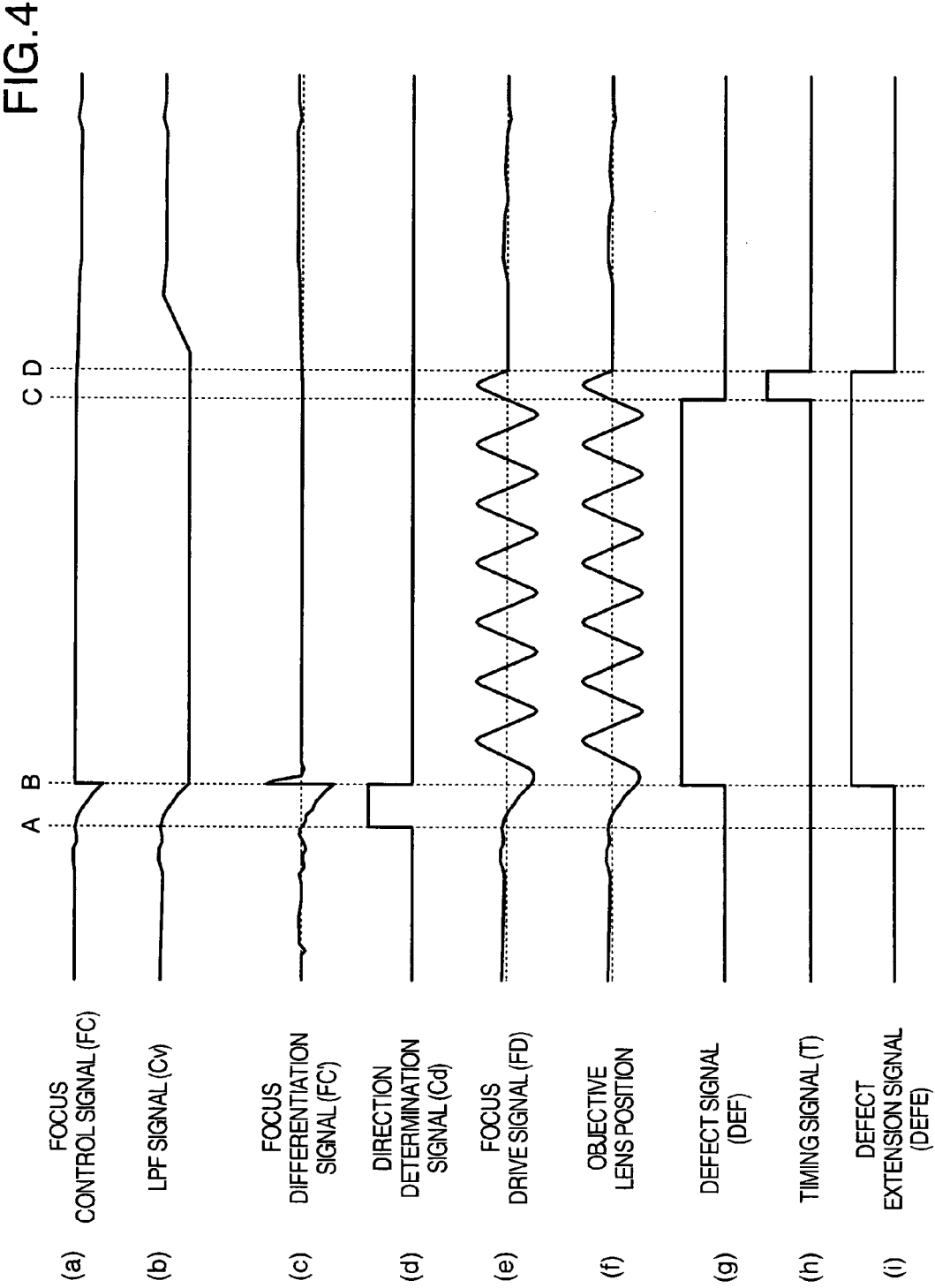
FIG. 4 shows operational waveforms of signals as a first case of focus control appearing in the optical disk device of the embodiment 1 of the present invention.

Explanation will further be made as to the operation of the aforementioned focus system by referring to FIG. 4. In FIG. 4, (a) shows a focus control signal FC, (b) shows a LPF signal Cv, (c) shows a focus differentiation signal FC', (d) shows a direction determination signal Cd, (e) shows a focus drive signal FD, (f) shows an objective lens 3 position, (g) shows a DEFECT signal DEF, (h) shows a timing signal T, (i) shows a DEFECT extension signal DEFE, and A to D indicate time points.

Explanation will be made in FIG. 4 in connection with a first case where, when starting to pass through a defect, the objective lens 3 is displaced toward a direction away from the disk 1 (when the disk displacement is '−(minus)'). First, in a duration ahead of the time point A, no defect is detected, the device is put in the normal state, and the signal DEF of (g) is at "LOW". At the time point A, the light beam spot starts passing through the defect. At this time, the signal DEF (g) is still at "LOW". As the spot passes through the defect, the signal FE starts to fluctuate and the signal FC of (a) is correspondingly varied. The then signal FC of (a) is the same as the signal FD of (e), the focus actuator 21 starts to operate according to the drive signal FD and the objective lens 3 is moved (duration between the points A and B, lower direction).

When the light spot starts to pass through the defect at the time point B, the signal DEF of (g) is changed from "LOW" to "HIGH". When the output signal of the signal FC of (a) between the time points A and B is regarded as positional information, a velocity and direction moving from the time point A to the time point B are known from the signal FC' of (c) corresponding to the differentiation of the positional information. In FIG. 4, the direction is identified by the polarity of the signal FC' of (c). Since the signal FC' of (c) oscillates in a lower (minus) direction from a center (reference) line, the signal Cd of (d) is changed to "HIGH". In FIG. 4, for example, when the signal FD of (e) oscillates from the center line to the lower (minus) direction, the focus actuator 21 is moved in a direction away from the disk 1 and the objective lens 3 is also moved in a direction away from the disk 1. As a result, the "HIGH" of the signal Cd of (d) indicates the direction away from the disk 1. The center line of the objective lens 3 position of (f) indicates the focused position, the lower (minus) direction from the center line indicates the direction away from the disk 1, and the upper (plus) direction from the center line indicates the direction approaching the disk 1.

When the signal DEF of (g) is changed to "HIGH" at the time point B, the signal Cv of (b) keeps its value. From the kept value of the signal Cv of (b) and the signal Cd of (d), a direction and a value for causing the oscillation waveform P to oscillate after the signal DEF of (g) changed to "HIGH" are determined. In FIG. 4, during "HIGH" period of the signal Cd of (d), that is, during the period between the time points A and B, the objective lens 3 starts to be moved in a direction away from the disk 1. Thu, the signal FD of (e) is output to the focus actuator 21 so as to move the objective lens 3 with the moving direction kept. The signal DEF of (g) keeps "HIGH" from the time point B. However, during this period (defect passage), such a signal FD of (e) as to cause the objective lens 3 to oscillate (in the vertical direction of FIG. 4) is applied to the focus actuator 21 to always control the objective lens 3 under the feedforward control. For this reason, the objective lens 3 position also varies like the objective lens is moved toward or away from the disk 1 according to the signal FD of (e). At this time, as mentioned above, the oscillating signal FD of (e) is required to have such a frequency as to sufficiently respond to the actuator 21. For example, the actuator of the optical disk oscillates sinusoidally at a frequency of about 1 kHz or lower.

The light beam spot then passes through the defect at the time point C. At this time, the signal DEF of (g) is changed from "HIGH" to "LOW". When the control of oscillating the objective lens 3 is stopped at this stage, there may, in some case, occur a situation that the objective lens 3 is located at a position away from the focused position. To avoid this, the signal FD of (e) is continued as far as the time point D when the objective lens 3 position of (f) becomes the focused point (in the vicinity of the center line in FIG. 4). This continuation (extension) is achieved by the signal T of (h) and the signal DEFE of (i). At the time point D, the signal DEF of (g) is already at "LOW", so that, when the signal DEF of (d) is used as it is for the control, the control is switched from the feedforward control caused by the signal FD of (e) causing the oscillation of the objective lens 3 to the normal feedback loop control. To avoid this, the signal T of (h) is set at "HIGH" during a period from the time point C when the signal DEF (g) is at "LOW" to the time point D when the objective lens 3 position of (f) is the focused position. A signal corresponding to a logical OR between the signal T of (h) and the signal DEF of (g) is used as the signal DEFE of (i) for control of the objective lens 3. As a result, the feedforward control can be achieved which uses the signal FD of (e) causing the oscillation of the objective lens 3 until the objective lens 3 position of (f) becomes the focused point. Under the above control, pulling in the focused point (return to the normal position) in the feedback control can be quickly achieved immediately after the defect passage, and information can be quickly read out from the disk 1.

<Focus Control—Second Case>

Figure 5:
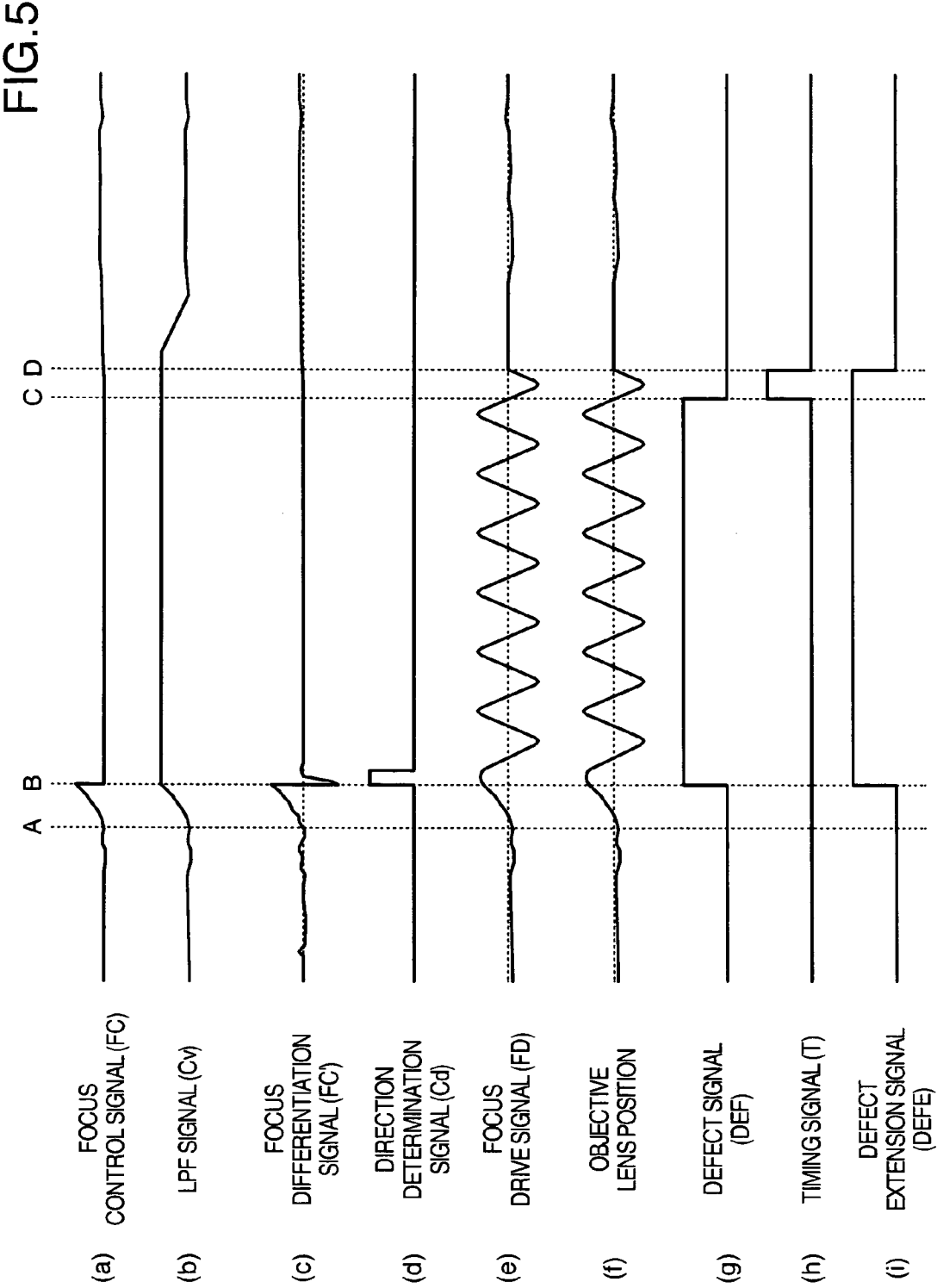
FIG. 5 shows operational waveforms of signals as a second case of focus control appearing in the optical disk device of the embodiment 1 of the present invention.

By referring to FIG. 5, explanation will be made in connection with a second case where, as the objective lens 3 starts to pass through a defect, the objective lens 3 is moved toward the disk 1 (when the disk displacement is '+' (plus)). The second case is opposite to the first case. That is the second case is substantially the same in explanation contents as the first case, but different therefrom in control direction, signal values and so on. In this case, the objective lens first starts to pass through a defect at the time point A. At this time, the signal DEF of (g) is at "LOW". As the objective lens passes through the defect, the signal FE starts to fluctuate during the defect passage, and the signal FC of (a) is correspondingly varied. Since the signal FC of (a) becomes the signal FD of (e) as it is, the focus actuator 21 starts to operate according to the drive signal and the objective lens 3 is moved. When the objective lens starts to pass through the defect, the signal DEF of (g) is changed to "HIGH" at the time point B. When the output signal of the signal FC of (a) between the points A and B is regarded as positional information, a velocity and a direction of the lens when the lens is moved from the point A to the point B are known from the signal FC' of (c) corresponding to the differentiation of the output signal. In FIG. 5, since the signal FC' of (c) oscillates from the center line in the upper (plus) direction, the signal Cd of (d) is at "LOW". In FIG. 5, when the signal FD of (e) oscillates from the center line in the upper (plus) direction, the focus actuator 21 is operated in such a direction as to approach the disk 1, and the objective lens 3 is also moved toward the disk 1. As a result, the "LOW" of the signal Cd of (d) indicates the direction approaching the disk 1. The center line of the objective lens 3 position of (f) indicates a focused position, a direction from the center line to the lower (minus) direction indicates a direction when the lens is moved away from the disk 1, and a direction from the center line to the upper (plus) direction indicates a direction when the lens approaches the disk 1.

At the time point B when the signal DEF of (g) becomes "HIGH", the value of the signal Cv of (b) is kept. From the kept value of the signal Cv of (b) and the signal Cd of (d), a direction and a value for causing the oscillation after the signal DEF of (g) is changed to "HIGH" are determined. In FIG. 5, during the "LOW" period of the signal Cd of (d), that is, during a period between the points A and B, the objective lens 3 starts to move in such a direction as to approach the disk 1. Thus the signal FD of (e) is output to the focus actuator 21 to cause the objective lens 3 to be moved with the moving direction kept. From the point B, the "HIGH" period of the signal DEP of (g) is continued. During this period, however, such a signal FD of (e) as to oscillate the objective lens 3 is applied to the focus actuator 21 to always control the objective lens 3 under the feedforward control. For this reason, the objective lens 3 position of (f) is also moved away from or toward the disk 1 according to the signal FD of (e). The objective lens passes through the defect at the point C, at which time the signal DEF of (g) is changed to "LOW". When the control of oscillating the objective lens 3 is stopped at this stage, there may, in some cases, occur such a situation that the objective lens 3 is located at a position away from the focused point. To avoid this, the signal FD of (e) is continued and output until the objective lens 3 position of (f) becomes the focused point D. At the point D, the signal DEF of (g) is already set at "LOW", so that the use of the signal DEF of (d) itself for the control causes the control to be switched from the feedforward control based on the signal FD of (e) to the normal feedback loop control. To avoid this, During a period from the point C when the signal DEF of (g) is changed to "LOW" to the point D when the objective lens 3 position of (f) becomes the focused point, the signal T of (h) is kept at "HIGH". When a signal corresponding to a logical OR between the signal T of (h) and the signal DEF of (g) is used as the signal DEFE of (i) for the control of the objective lens 3, the feedforward control of using the signal FD of (e) to cause the oscillation of the objective lens 3 until the objective lens 3 position of (f) becomes the focused point is achieved. Under the aforementioned control, immediately after the defect passage, the pulling in the focused point in the feedback control can be quickly attained and correct information can be quickly read out from the disk 1.

<Tracking Control>

Explanation will next be made as to the tracking control of controlling the objective lens 3 in the horizontal direction relative to the disk 1 as the control of the defect. The concept of this control is basically the same as the focus control, corresponding waveforms are similar to those in FIGS. 4 and 5, and explanation thereof is omitted. The functions of the signals DEFE, Cv, Cd, P, T, and so on are substantially the same as those in the focus control, except for the signals having different values therefrom. In such a state that the tracking control is carried out so far stationarily in the on-track condition, first of all, an output TrC from the tracking compensator 9 is supplied to the switch 16d. Since the switch 16d is switched to the terminal G in the normal state, the output TrC of the tracking compensator 9 is output via the switch 16d to the LPF 12b as it is.

The LPF 12b forms a low pass filter having a low band corresponding to about 1/10 of a band of controlling the objective lens 3 of the tracking system. Since the low pass filter has such a characteristic as to pass signals having frequencies corresponding to about the rotational frequency of the spindle motor 6, the filter is immune to such a high frequency waveform as noise. In other words, the filter keeps the value of a control voltage immediately prior to the defect passage. The output Cv of the LPF 12b is supplied to the oscillation waveform generation circuit 14b and to the switch 16d.

Meanwhile, the tracking control signal TrC issued from the tracking compensator 9 is supplied to the differentiation circuit 13b. Code information (direction determination signal Cd) on a signal TrC' corresponding to the differentiation of the tracking control signal TrC input to the differentiation circuit 13b is supplied to the oscillation waveform generation circuit 14b. On the basis of the code information Cd supplied from the differentiation circuit 13b, the oscillation waveform generation circuit 14b generates a waveform P to be oscillated from the oscillating direction 'd' and from the level of the signal Cv supplied from the LPF 12b. The oscillating waveform P is required to have such a frequency that the actuator 22 sufficiently respond thereto. For example, for the actuator of the optical disk, the waveform is a sinusoidal wave having a frequency of about 1 kHz or less. The signal P generated in the oscillation waveform generation circuit 14b is supplied to the switch 16b. During the defect passage, the switch 16b is switched to the terminal C so that the signal P generated in the oscillation waveform generation circuit 14b is supplied via the switch 16b to the drive circuit 18b. The drive circuit 18b generates a voltage (a tracking drive signal TrD) for operating the actuator 22, and outputs the voltage to the pickup 4. The operation of the actuator 22 based on the voltage received from the drive circuit 18b causes the objective lens 3 to be controllably oscillated in the tracking direction horizontal to the disk 1.

When the light beam spot now passes through a defect as in the focus control, the signal DEF is generated in the signal processing circuit 7. The signal DEF is supplied to the extension circuit 15b and also to the oscillation waveform generation circuit 14b. The timing signal T is supplied from the oscillation waveform generation circuit 14b to the extension circuit 15b. On the basis of the signal DEF received from the signal processing circuit 7 and the timing signal T received from the oscillation waveform generation circuit 14b, the extension circuit 15b generates a DEFECT extension signal DEFE. The signal DEFE is supplied to the switches 16b and 16d. When the signal DEF is changed to "HIGH", the oscillation waveform generation circuit 14b outputs an oscillating waveform P having the level of the oscillating waveform P and the oscillation start direction 'd' determined to oscillate the objective lens 3, on the basis of the direction determination signal Cd received from the differentiation circuit 13b and the level of the signal Cv received from the LPF 12b.

As in the focus control, the oscillation waveform generation circuit 14b is arranged so as not to stop the output of the oscillating waveform P immediately when the DEF signal starts oscillation during the "HIGH" period and then the defect passage causes the DEF signal to be changed to "LOW". That is, in order to continue the oscillation until the objective lens 3 is located at an on-track position on a pit after the defect passage, the oscillation waveform generation circuit 14b generates the timing signal T after the signal DEF is changed to "LOW" and supplies the signal T to the extension circuit 15b. The extension circuit 15b in turn generates a DEFECT extension signal DEFE to extend the signal DEF on the basis of the timing signal T even after the signal DEF is changed to "LOW". Even after the signal DEFE causes the signal DEF generated in the signal processing circuit 7 to be changed from "HIGH" to "LOW", the signal DEFE continuously keeps its "HIGH" period for a while, so that, in response to it, the switch 16b is kept switched to the terminal D and the switch 16d is kept switched to the terminal H.

In such a state that the switch 16b is switched to the terminal D and the switch 16d is switched to the terminal H, the control loop of the tracking control is open and thus no feedback loop control is carried out. That is, the signal P from the oscillation waveform generation circuit 14b causes the control to be changed to the feedforward control. Since the switch 16d is already switched to the terminal H during the "HIGH" period of the signal DEFE, the output Cv from the LPF 12b is supplied again to the LPF 12b so that the value of the output Cv of the LPF 12b becomes constant.

As mentioned above, during the defect passage, the objective lens 3 is controlled to be oscillated in the tracking direction. As a result, immediately after the defect passage, tracking pulling in the feedback control can be quickly attained and information from the disk 1 can be quickly read out from the disk 1.

As has been explained above, the optical disk device of the embodiment 1 is arranged so that, while the light beam spot passes through the defect in a reproduction/record mode of the optical disk 1, the actuators 21 and 22 are control to oscillate the objective lens 3 under the feedforward control. As a result, after the defect passage, the objective lens 3 can be prevented from departing from the focused point or the tracking position too much. In other words, the objective lens can be quickly returned to the normal position and reproducing/reading operation ca be resumed. When compared with the related part, such a duration 'd' not allowing the correct information reading as shown in FIG. 9 can be shortened as the duration between the points C and D in FIG. 4 or 5 in the embodiment 1.

Embodiment 2

Explanation will next be made as to an optical disk device in accordance with an embodiment 2, by referring to FIGS. 6 to 8. The embodiment 2 is different from the embodiment 1 in the driving control of returning the objective lens to the normal position and in waveforms.

<Device Arrangement>

Figure 6:
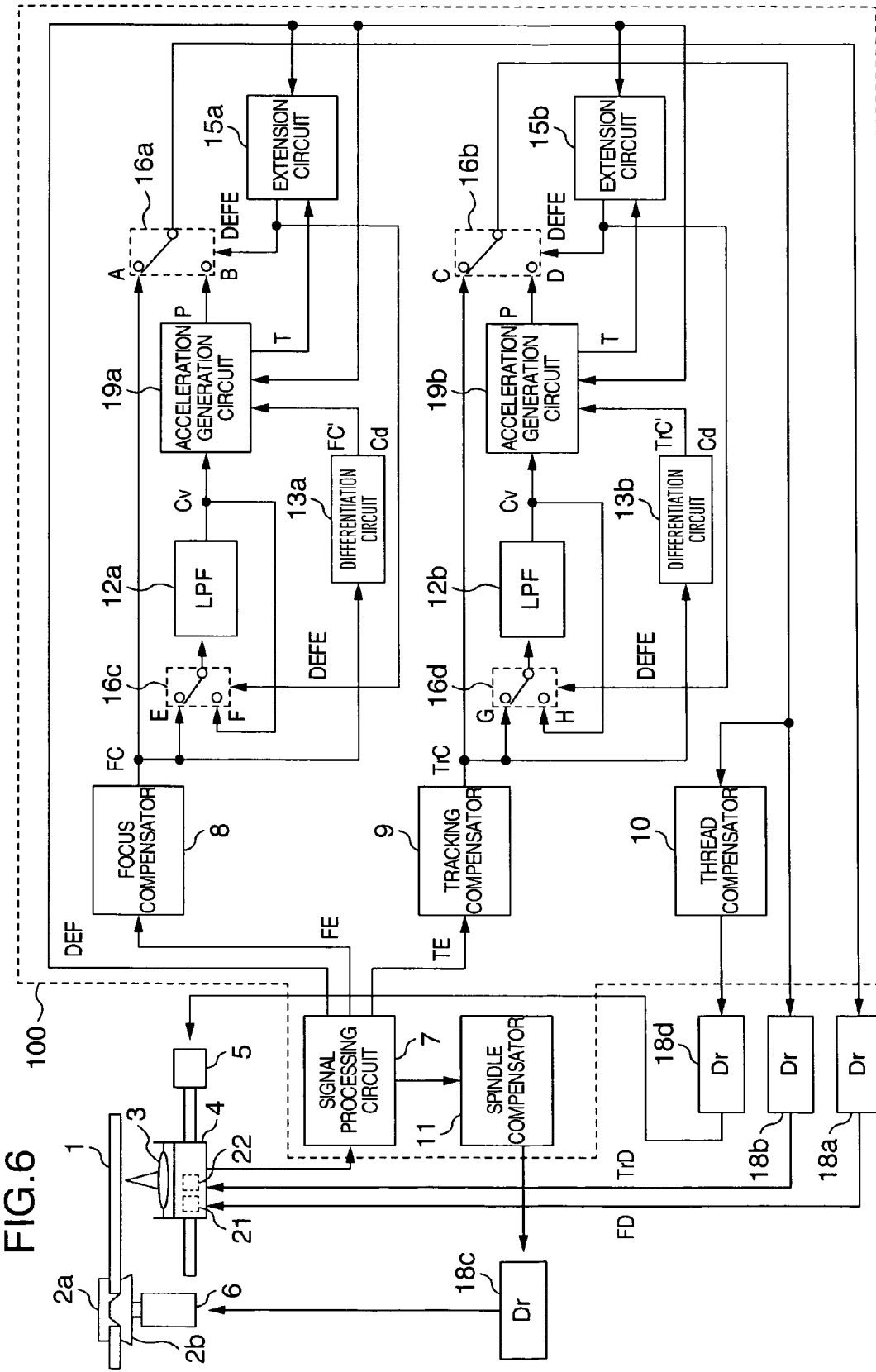
FIG. 6 shows an arrangement of an optical disk device in accordance with an embodiment 2 of the present invention.

FIG. 6 shows details of a circuit (drive control circuit) part of an arrangement of the optical disk device of the embodiment 2 of the present invention, in particular, associated with servo control. The arrangement of FIG. 6 is different from that of FIG. 1 not in the oscillation waveform generation circuits 19a, 19b but in provision of acceleration generation circuits 19a, 19b. Explanation will be made as to only a part of the embodiment 2 different from the embodiment 1.

A means for generating a signal to apply acceleration to the objective lens 3 is implemented in the form of a feedforward control system mainly including the acceleration generation circuits 19a, 19b.

<Focus Control>

The focus control will be explained. FIGS. 7 and 8 show operational waveforms of signals for the focus control based on the arrangement of FIG. 6. An output (LPF signal Cv) from the LPF 12a is supplied to the acceleration generation circuit 19a and the switch 16c. Code information (direction determination signal Cd) on a signal (focus differentiation signal FC') corresponding to the differentiation of the signal FC input to the differentiation circuit 13a is supplied to the acceleration generation circuit 19a.

On the basis of the code information (Cd) received from the differentiation circuit 13a, the acceleration generation circuit 19a generates an acceleration waveform P from a direction 'd' in which acceleration is applied to the objective lens 3 and from the level of the signal Cv received from the LPF 12a. The signal P for applying acceleration to the objective lens also involves information about the acceleration applying direction 'd'. The waveform P applies an acceleration to the objective lens in an opposite direction after applying an acceleration in a first direction of a time period. Further, the acceleration in the first direction is applied after the acceleration in the opposite direction of a time period. The above is alternately repeated.

As a result, the waveform P for causing alternate application of the acceleration in the forward and reverse directions is, for example, a rectangular wave. The waveform P is required to have such a frequency that the actuator 21 sufficiently responds thereto. For example, for the actuator of the optical disk, the waveform is a rectangular wave having a frequency of about 1 kHz or less. The signal P generated in the acceleration generation circuit 19a is supplied to the switch 16a. During the defect passage, the switch 16a is switched to the terminal B, so that the signal P generated in the acceleration generation circuit 19a is supplied via the switch 16a to the drive circuit 18a. The signal P causes the drive circuit 18a to generate a voltage FD to operate the actuator 21 and to supply the voltage into the pickup 4. The voltage FD from the drive circuit 18a causes acceleration to be applied to the objective lens 3 in the focus direction. When the acceleration is alternately applied in the first application direction and in the opposite application direction, the objective lens is controlled to be made stationary (refer to (e), (f), etc. in FIG. 7).

A signal DEF issued from the signal processing circuit 7 is supplied to the extension circuit 15a and also to the acceleration generation circuit 19a. A timing signal T from the acceleration generation circuit 19a is supplied to the extension circuit 15a.

From the signal DEF received from the signal processing circuit 7 and from the timing signal T received from the acceleration generation circuit 19a, the extension circuit 15a generates a signal DEFE. When the signal DEF generated in the signal processing circuit 7 is changed to "HIGH", the acceleration generation circuit 19a, from the direction determination signal Cd input from the differentiation circuit 13a and from the level of the signal Cv input from the LPF 12a, determines the level of the acceleration waveform P and the first-acceleration applying direction 'd', and in order to make the objective lens 3 stationary, and thereafter outputs an acceleration waveform P alternately varying in plus and minus directions after a constant time period. The acceleration waveform P is a block pulse which is output during the "HIGH" period of the signal DEF (which is a rectangular waveform varying between "HIGH" and "LOW").

The acceleration generation circuit 19a is arranged, when acceleration is applied with the acceleration waveform P at the beginning of the "HIGH" period of the signal DEF and thereafter when the defect passage causes the signal DEF to be changed to "LOW", so as not to immediately stop the output (rectangular wave). That is, in order to continue the rectangular wave of the acceleration waveform P to uniformly apply the acceleration after the defect passage, the acceleration generation circuit 19a generates the timing signal T after the signal DEF is changed o "LOW", and supplies the timing signal T to the extension circuit 15a. In the extension circuit 15a in turn generates the signal DEFE on the basis of the timing signal T even after the signal DEF is changed to "LOW". The signal FEFE causes the signal DEFE to continue the "HIGH" period for a while even immediately after the signal DEF is changed from "HIGH" to "LOW". And in response to it, the switch 16a is kept switched to the terminal B, and the switch 16c is kept switched to the terminal F.

In such a state that the switch 16a is kept switched to the terminal B and the switch 16c is kept switched to the terminal F, the control loop of the focus control is open and no such feedback control as mentioned above is carried out. That is, the signal P from the acceleration generation circuit 19a causes the control is transited to the feedforward control.

<Focus Control—First Case>

Figure 7:
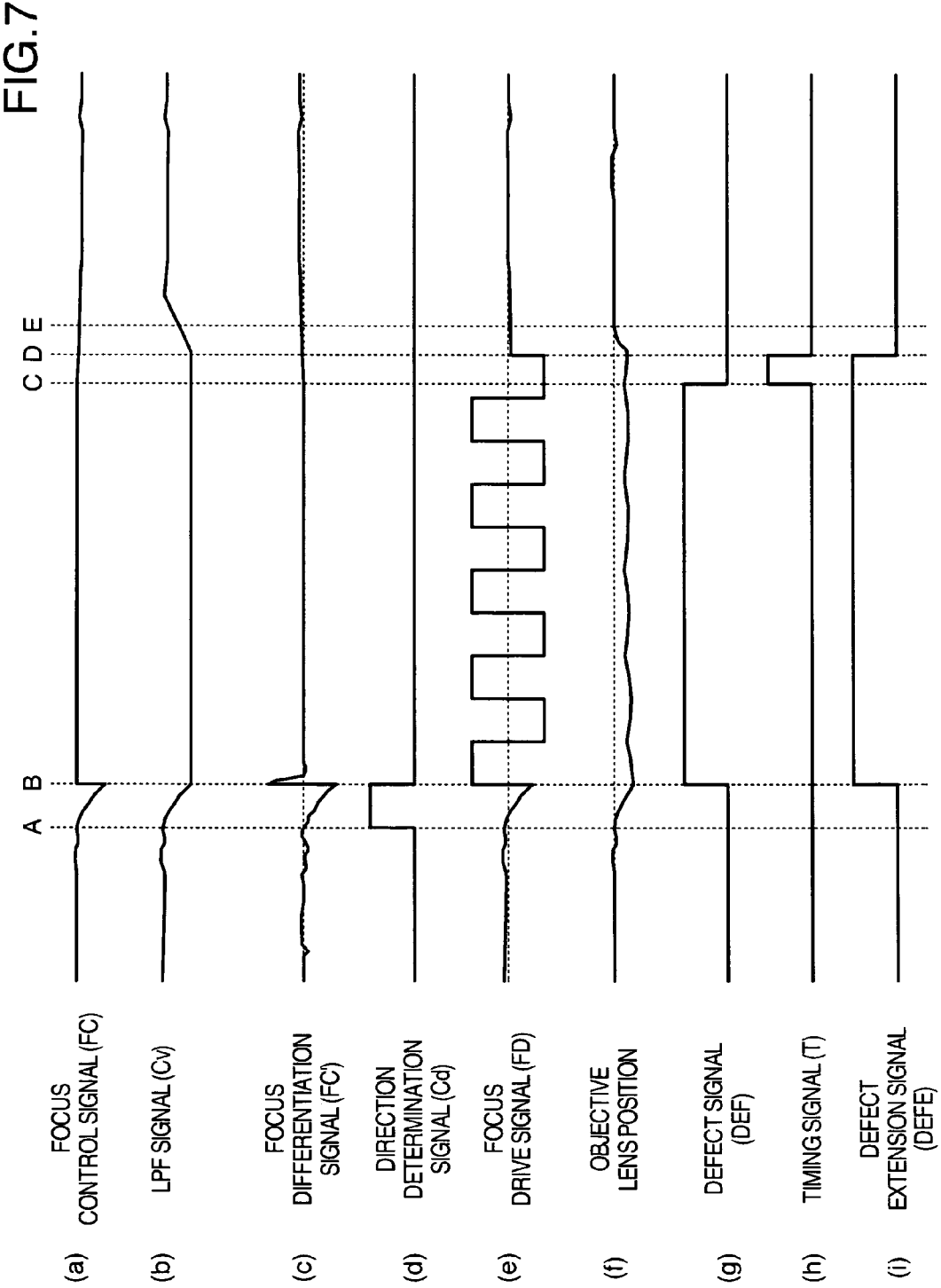
FIG. 7 shows operational waveforms of signals as a first case of the focus control appearing in the optical disk device of the embodiment 2 of the present invention.
Figure 8:
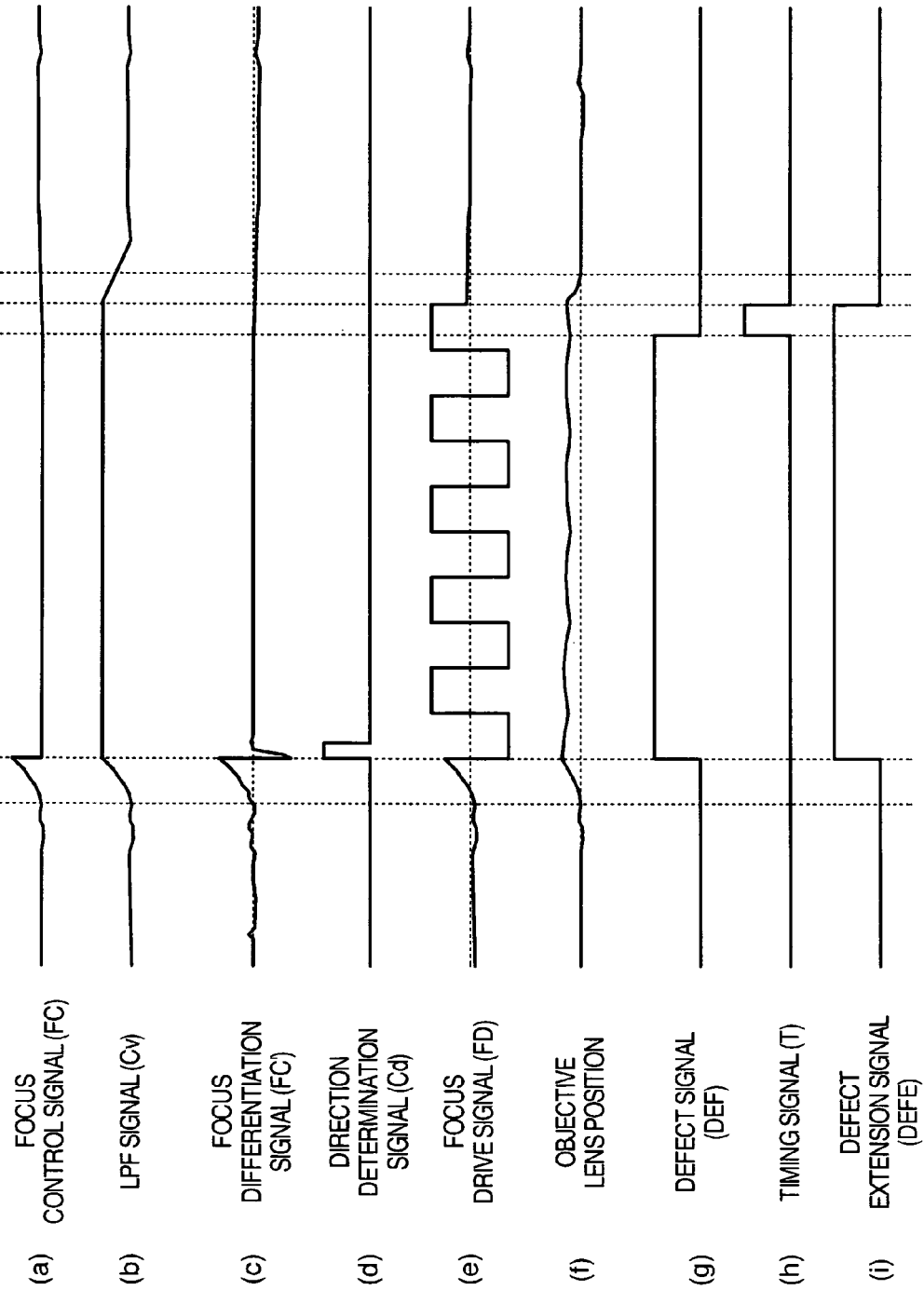
FIG. 8 shows operational waveforms of signals as a second case of the focus control appearing in the optical disk device of the embodiment 2 of the present invention.

Explanation will be then made as to the operation the aforementioned focus system with use of FIG. 7. In FIG. 7, details of the focus drive signal FD of (e) and the objective lens 3 position of (f) are different from those of (e) and (f) in FIG. 4. Further a duration between the points D and E is different in that in FIG. 4 and A to E denote time points.

FIG. 7 explains, as the first case, when the objective lens 3 is moved in a direction away from the disk 1 upon defect passage (when a disk displacement is − (minus).

At the time point B, the value of the signal Cv of (b) when the signal DEF of (g) is changed to "HIGH" is kept. From the kept value of the signal Cv of (b) and from the signal Cd of (d), the acceleration waveform P determines a first-acceleration applying direction and a value after the signal DEF of (g) is changed to "HIGH". In FIG. 7, during the "HIGH" period of the signal Cd of (d), that is, during a duration between the points A and B, the objective lens 3 starts to be moved in a direction away from the disk 1. Thus, in order to move the objective lens 3 in such a manner as to keep its moving direction, the signal FD of (e) is output to the focus actuator 21. From the time point B, the signal DEF of (g) keeps its "HIGH" duration. During this period (during the defect passage), however, the signal FD of (e) is applied to the focus actuator 21 so that the objective lens 3 is made stationary (during a constant position period) in (f) of FIG. 7) to put the objective lens 3 always in the feedforward control. To this end, such accelerations as to move the objective lens away from and toward the disk 1 are alternately applied to the objective lens, thus resulting in that the objective lens is made stationary. At this time, the acceleration waveform FD of (e) to be applied to make the objective lens stationary is required to such a frequency that the actuator 21 sufficiently respond thereto as mentioned above. For example, for the actuator of the optical disk, the acceleration is alternately applied with a rectangular wave having a frequency of about 1 kHz or less to make the objective lens stationary.

At the time point C, next, a light beam spot passes through a defect. At this time, the signal DEF of (g) is changed from "HIGH" to "LOW". At this stage, when the control of applying such a signal as to apply the acceleration to the objective lens 3 is stopped, there may occur in some cases such a situation that the acceleration applied to the objective lens 3 causes the objective lens to be located at a position away from its focused point. To avoid this, (f) until a point D when the plus and minus accelerations applied to the objective lens 3 become equal to each other (when the acceleration applied time for the plus and minus sides become equal to each other in the case of FIG. 7), the signal FD of (e) is kept and output. The continuation (extension) is carried out with use of the signal T of (h) and the signal DEFE of (i). At the point D, the signal DEF of (g) is already changed to "LOW". Thus, the use of the signal DEF of (d) as it is causes the control to be switched from the feedforward control based on the signal FD of (e) applying the acceleration to the objective lens 3 to the normal feedback loop control. To avoid this, during a period from the point C when the signal DEF of (g) is changed to "LOW" to the point D when the application times of the forward and reverse accelerations become equal to each other, the signal T of (h) is kept at "HIGH" level. A signal corresponding to a logical OR between the signal T of (h) and the signal DEF of (g) is used as the signal DEFE of (i) for control of the objective lens 3. As a result, until the point D when the application times of the forward and reverse accelerations become equal to each other, the feedforward control using the signal FD of (e) for applying the acceleration to the objective lens 3 is attained. Under the above control, pulling in the focused point in the feedback control immediately after the defect passage (return to the normal position) can be quickly achieved (point E), and thus information can be quickly read out from the disk 1.

<Focus Control—Second Case>

By referring to FIG. 8, explanation will be made in connection with a second case where the objective lens 3 is moved toward the disk 1 as the objective lens starts to pass through the defect (where disk displacement is + (plus)). In this connection, the second case is opposite to the aforementioned first case, the contents of explanation which follows is substantially the same as in the first case but is different therefrom in control direction, signal values and so on.

At the point B when the signal DEF of (g) is changed to "HIGH", the value of the signal Cv of (b) is kept. From the kept value of the signal Cv of (b) and from the signal Cd of (d), the acceleration waveform P determines a direction for the acceleration to be first applied and a value after the signal DEF of (g) is changed to "HIGH". In FIG. 8, during the "LOW" period of the signal Cd of (d), that is, during a period between the points A and B, the objective lens 3 starts to be moved toward the disk 1. In order to move the objective lens 3 in such a direction as keep the moving direction, the signal FD of (e) is output to the focus actuator 21. From the point B, the signal DEF of (g) keeps its "HIGH" period. During this period, such a signal FD of (e) as to cause the objective lens 3 to be made stationary (a constant position period in the signal (f) FIG. 8) is applied to the focus actuator 21, so that the objective lens 3 is controlled always under the feedforward control. As a result, such accelerations as to move the objective lens 3 toward or away from the disk 1 are alternately applied according to the signal FD of (e), resulting in that the objective lens is eventually made stationary. At the point C, the objective lens passes through a defect. At this time the signal DEF of (g) is changed to "LOW". When the control of applying the acceleration applying signal to the objective lens 3 at this stage, there may occur, in some case, such a situation that the objective lens 3 is located at a position away from its focused position depending on the acceleration applied to the objective lens 3. To avoid this, until the point D when the forward and reverse accelerations to be applied to the objective lens 3 become equal to each other (acceleration applying times for plus and minus sides become equal to each other), the signal FD of (e) is kept and output. At the point D, the signal DEF of (g) is already changed to "LOW". Thus the use of the signal DEF of (d) as it is for the control causes the control to be switched from the feedforward control based on the signal FD of (e) to the normal feedback loop control. To avoid this, during a period from the point C when the signal DEF of (g) is changed to "LOW" to the point D when the acceleration applying times of the plus and minus sides become equal to each other, the signal T of (h) is kept at "HIGH". A signal corresponding to a logical OR between the signal T of (h) and the signal DEF of (g) is used as the signal DEFE of (i) for control of the objective lens 3. As a result, until the point D when the acceleration applying times of the plus and minus sides become equal to each other, the signal FD of (e) is used to apply the acceleration to the objective lens 3, that is, the feedforward control is achieved. Under the above control, pulling in the focused point in the feedback control immediately after the defect passage can be quickly attained (point E), and correct information can be quickly read out from the disk 1.

<Tracking Control>

The tracking control will be then explained. The concept of this control is basically the same as the focus control, corresponding waveforms are similar to those in FIGS. 7 and 8, and explanation thereof is omitted.

The output Cv from the LPF 12*b* is supplied to the acceleration generation circuit 19*b* and also to the switch 16*d*.

The tracking control signal TrC issued from the tracking compensator 9 is supplied to the differentiation circuit 13*b*. Code information (direction determination signal Cd) on a signal TrC' corresponding to the differentiation of the signal TrC input to the differentiation circuit 13*b* is supplied to the acceleration generation circuit 19*b*. On the basis of the code information Cd received from the differentiation circuit 13*b*, the acceleration generation circuit 19*b* generates an acceleration waveform P from a direction 'd' for the acceleration to be applied to the objective lens 3 and from the level of the signal Cv received from the LPF 12*b*. As the signal P for applying an acceleration to the objective lens 3, the waveform P for applying the acceleration including the acceleration applying direction 'd' as information is applied in a direction opposite to the first acceleration applying direction after the constant time period. Further, an acceleration is applied in the first acceleration applying direction after a constant time period. This acceleration application is alternately repeated.

The waveform P for applying the acceleration in the plus and minus directions is, for example, a rectangular wave. The waveform P is required to have such a frequency that the actuator 22 sufficiently responds thereto. For example, for the actuator of the optical disk, the rectangular wave has a frequency of about 1 kHz or less. The signal P generated in the acceleration generation circuit 19*b* is supplied to the switch 16*b*. During the defect passage, the switch 16*b* is switched to the terminal C, so that the signal P generated in the acceleration generation circuit 19*b* is supplied via the switch 16*b* to the drive circuit 18*b*. The drive circuit 18*b* generates a voltage (tracking drive signal TrD) for operating the actuator 22, and supplies the voltage to the pickup 4. The voltage from the drive circuit 18*b* causes the acceleration to be applied to the objective lens 3 in the tracking direction. When the acceleration is applied alternately in the first acceleration applying direction and then in the direction opposite thereto, the objective lens 3 is controlled to be made stationary.

When the light beam spot now passes through a defect as in the focus control, the signal processing circuit 7 generates a signal DEF. The signal DEF is supplied to the extension circuit 15*b* and also to the acceleration generation circuit 19*b*. The timing signal T from the acceleration generation circuit 19*b* is supplied to the extension circuit 15*b*. The extension circuit 15*b* in turn generates a signal DEFE from the signal DEF received from the signal processing circuit 7 and from the timing signal T received from the acceleration generation circuit 19*b*. The signal DEFE is supplied to the switches 16*b* and 16*d*. When the signal DEF is changed to "HIGH", the acceleration generation circuit 19*b*, from the direction determination signal Cd received from the differentiation circuit 13*b* and from the level of the signal Cv received from the LPF 12*b*, determines the level of the acceleration waveform P and the first acceleration applying direction 'd', and then outputs the acceleration waveform P which is inverted between plus and minus sides at intervals of a constant time to make the objective lens 3 stationary.

As in the focus control, the acceleration generation circuit 19*b* is arranged, when the acceleration is applied with the acceleration waveform P at the beginning of the "HIGH" period of the signal DEF and thereafter when the defect passage causes the signal DEF to be changed to "LOW", so as not to immediately stop the output (rectangular wave) of the acceleration waveform P. That is, in order to continue the rectangular wave of the acceleration waveform P after the signal DEF is changed to "LOW" to apply the acceleration uniformly after the defect passage, the acceleration generation circuit 19b generates the timing signal T after the signal DE is changed to "LOW" and supplies the timing signal to the extension circuit 15b. The extension circuit 15b in turn generates a signal DEFE which extends the signal DEF on the basis of the timing signal T even after the signal DEF is changed to "LOW". Even after the signal DEF generated in the signal processing circuit 7 based on the signal DEFE is changed from "HIGH" to "LOW", the "HIGH" period of the signal DEFE is continued for a while. In response to it, the switch 16b is kept switched to the terminal D and the switch 16d is kept switched to the terminal H.

When the switch 16b is kept switch to the terminal D and the switch 16d is kept switched to the terminal H, the control loop of the tracking control is open so that no feedback loop control is carried out. That is, the signal P from the acceleration generation circuit 19b causes the control to be put in the feedforward control state. During the "HIGH" period of the signal DEFE, the switch 16d is kept switched to the terminal H. Thus the output Cv from the LPF 12b is supplied to the LPF 12b so that the output value Cv of the LPF 12b becomes constant.

Since the signal FD of (e) for applying the acceleration to the objective lens 3 until the point P when the applying times of the acceleration in the plus and minus sides of the tracking direction become equal to each other as mentioned above, is used, the feedforward control can be achieved. Under the above control, the tracking drawing in the feedback control can be quickly attained (point E), and information can be quickly read out from the disk 1.

As has been explained above, the optical disk device of the embodiment 2 is arranged so that, in the reproduction/record mode of the disk 1, the actuators 21 and 22 are controlled during the defect passage of the light beam spot to apply the acceleration alternately in the first acceleration applying direction and then in the direction opposite thereto under the feedforward control, thus making the objective lens 3 stationary. As a result, after the defect passage, the objective lens 3 can be avoided from departing from its focused point or tracking position. In other words, the objective lens can be quickly returned to its normal position and reproducing/reading operation can be resumed. When compared with the related art, the embodiment 2 can shorten the duration 'd' in FIG. 9 disabling correct information reading to such a duration between the points D and E as shown in FIG. 7 or 8.

Specific explanation has been made in connection with the embodiments of the present invention made by the inventors of this application. However, the present invention is not limited to these embodiments but various modifications may be made without departing the spirit and scope thereof, as a matter of course.

The present invention can be similarly applied not only to an optical disk device having an optical data reading section (including an objective lens, a semiconductor laser, a photodetector, and an actuator) with respect to an optical disk medium, but also to even a disk device having an arrangement similar thereto (having a different mechanism of detecting a defect on a medium and a different mechanism of operating a data reading section).

The present invention can be applied to a circuit for controllably driving a disk medium, a disk device (disk drive device) therefore, and so on.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk drive control circuit provided in an optical disk device including an objective lens for condensing a laser beam on a recording layer of a disk, and a pickup for focusing the laser beam on the disk and detecting reflected light from the disk, said optical disk drive control circuit comprising:
   a first means for holding a signal which drives the objective lens, the signal including at least one of a focus control signal (FC), a tracking control signal (TrC), a focus drive signal (FD), and a tracking drive signal (TrD);
   a second means for detecting a moving direction of the objective lens; and
   a third means for generating a signal which applies an acceleration to the objective lens,
   wherein, when a spot of the light beam passes through a flaw or defect present on the disk, the third means makes the objective lens stationary with a normal position as its center on the basis of the moving direction of the objective lens detected by the first and second means;
   wherein the second means has a differentiation circuit for differentiating the signal which drives the objective lens, and the third means generates, from an output of the differentiation circuit, a waveform which applies the acceleration to the objective lens to make the objective lens stationary; and
   wherein the waveform for applying the acceleration to the objective lens to make the objective lens stationary is a rectangular wave whose plus and minus polarities are alternately repeated.

2. An optical disk drive control circuit according to claim 1, further comprising:
   a first drive control circuit for detecting a focus error signal on the basis of a signal from the pickup and for issuing a signal which controls a focus actuator relative to the objective lens;
   a second drive control circuit for detecting a tracking error signal on the basis of the signal from the pickup and for issuing a signal which controls a tracking actuator relative to the objective lens; and
   a circuit for detecting the flaw or defect and issuing a signal which prescribes a time period of passage of the flaw or defect,
   wherein the third means applies the acceleration in focus and tracking directions to the objective lens according to the signal prescribing a passage period of the flaw or defect during the defect passage to stop the objective lens and to control the objective lens in such a manner that, immediately after the passage of the flaw or effect, the objective lens is located at the normal position or at a position in the vicinity thereof.

3. An optical disk drive control circuit according to claim 1, further comprising:
   a first drive control circuit for detecting a focus error signal on the basis of a signal from the pickup and for issuing a signal which controls a focus actuator relative to the objective lens;
   a second drive control circuit for detecting a tracking error signal on the basis of the signal from the pickup and for issuing a signal which controls a tracking actuator relative to the objective lens;
   a circuit for detecting the flaw or defect and issuing a signal which prescribes a time period of passage of the flaw or defect; and
   a circuit for issuing a signal which extends the signal prescribing the passage period of the flaw or defect,
   wherein the third means applies the acceleration in focus and tracking directions to the objective lens according to the signal prescribing a passage period of the flaw or defect during the defect passage to stop the objective lens and to control the objective lens in such a manner that, immediately after the passage of the flaw or effect, the objective lens is returned to a focused point or to an on-track position.

4. An optical disk drive control circuit provided in an optical disk device including an objective lens that condenses a laser beam on a recording layer of a disk, and a pickup that focuses the laser beam on the disk and detects reflected light from the disk, said optical disk drive control circuit comprising:
- a first unit that holds a signal which drives the objective lens, the signal including at least one of a focus control signal (FC), a tracking control signal (TrC), a focus drive signal (FD), and a tracking drive signal (TrD);
- a second unit that detects a moving direction of the objective lens; and
- a third unit that generates a signal which applies an acceleration to the objective lens,
- wherein, when a spot of the light beam passes through a flaw or defect present on the disk, the third unit makes the objective lens stationary with a normal position as its center on the basis of the moving direction of the objective lens detected by the first and second unit;
- wherein the second unit has a differentiation circuit that differentiates the signal which drives the objective lens, and the third unit generates, from an output of the differentiation circuit, a waveform which applies the acceleration to the objective lens to make the objective lens stationary; and
- wherein the waveform that applies the acceleration to the objective lens to make the objective lens stationary is a rectangular wave whose plus and minus polarities are alternately repeated.

5. An optical disk drive control circuit according to claim 4, further comprising:
- a first drive control circuit that detects a focus error signal on the basis of a signal from the pickup and that issues a signal which controls a focus actuator relative to the objective lens;
- a second drive control circuit that detects a tracking error signal on the basis of the signal from the pickup and that issues a signal which controls a tracking actuator relative to the objective lens; and
- a circuit that detects the flaw or defect and issues a signal which prescribes a time period of passage of the flaw or defect,
- wherein the third unit applies the acceleration in focus and tracking directions to the objective lens according to the signal prescribing a passage period of the flaw or defect during the defect passage to stop the objective lens and to control the objective lens in such a manner that, immediately after the passage of the flaw or effect, the objective lens is located at the normal position or at a position in the vicinity thereof.

6. An optical disk drive control circuit according to claim 4, further comprising:
- a first drive control circuit that detects a focus error signal on the basis of a signal from the pickup and that issues a signal which controls a focus actuator relative to the objective lens;
- a second drive control circuit that detects a tracking error signal on the basis of the signal from the pickup and that issues a signal which controls a tracking actuator relative to the objective lens;
- a circuit that detects the flaw or defect and issue a signal which prescribes a time period of passage of the flaw or defect; and
- a circuit that issues a signal which extends the signal prescribing the passage period of the flaw or defect,
- wherein the third unit applies the acceleration in focus and tracking directions to the objective lens according to the signal prescribing a passage period of the flaw or defect during the defect passage to stop the objective lens and to control the objective lens in such a manner that, immediately after the passage of the flaw or effect, the objective lens is returned to a focused point or to an on-track position.

* * * * *